United States Patent
Hancock et al.

(10) Patent No.: US 6,513,310 B1
(45) Date of Patent: Feb. 4, 2003

(54) LAWN MOWER HAVING DISABLING FEATURE

(75) Inventors: Frank H. Hancock, Jackson, GA (US); Stephen C. Price, Barnesville, GA (US); James R. Powers, Conyers, GA (US); Steven D. Smyly, Griffin, GA (US); Lucius L. Cole, College Park, GA (US)

(73) Assignee: Snapper, Inc., McDonough, GA (US)

( * ) Notice: Subject to any disclaimer, the term of this patent is extended or adjusted under 35 U.S.C. 154(b) by 0 days.

(21) Appl. No.: 09/633,007

(22) Filed: Aug. 4, 2000

Related U.S. Application Data
(60) Provisional application No. 60/147,370, filed on Aug. 5, 1999.

(51) Int. Cl.[7] .................................................. A01D 75/00
(52) U.S. Cl. ....................................... 56/10.2 R; 56/10.8
(58) Field of Search ........................... 56/10.2 R, 10.4, 56/10.8, 11.3; 180/274, 277, 279, 275

(56) References Cited

U.S. PATENT DOCUMENTS

| | | | | |
|---|---|---|---|---|
| 1,174,709 A | * | 3/1916 | Gilbert | 180/277 |
| 2,588,815 A | * | 3/1952 | Fasolino | 180/275 |
| 3,570,225 A | * | 3/1971 | Miskiewicz | 180/277 |
| 3,984,967 A | | 10/1976 | Jones | |
| 3,999,643 A | | 12/1976 | Jones | |
| 4,688,656 A | * | 8/1987 | Kent | 180/279 |
| 5,148,886 A | * | 9/1992 | Parsons | 180/275 |
| 5,314,038 A | | 5/1994 | Peterson, Jr. | |
| 5,528,888 A | * | 6/1996 | Miyamoto et al. | 56/10.2 F |
| 5,703,450 A | * | 12/1997 | Josephs | 318/379 |
| 5,994,857 A | | 11/1999 | Peterson, Jr. et al. | |
| 6,026,645 A | | 2/2000 | Peter et al. | |
| 6,044,632 A | * | 4/2000 | Schmatz et al. | 56/10.2 R |
| 6,109,010 A | | 8/2000 | Heal et al. | |

FOREIGN PATENT DOCUMENTS

JP          10006890 A    *   1/1998   ................. 180/277

* cited by examiner

Primary Examiner—Thomas B. Will
Assistant Examiner—Meredith C. Petravick
(74) Attorney, Agent, or Firm—Alston & Bird LLP

(57) ABSTRACT

A disabling feature used with a lawn mower, for disabling the drive wheels of a lawn mower when an obstacle is encountered. Braking, engine kill, blade stopping, and declutching is contemplated upon the tripping of a pivotable contact device which in one embodiment is configured to be tripped when contacting an object while in reverse. A directional extension flap is also provided.

3 Claims, 8 Drawing Sheets

LAWN MOWER HAVING DISABLING FEATURE

CROSS REFERENCE TO RELATED APPLICATIONS

This application claims the benefit of and incorporates by reference U.S. Provisional Patent Application Ser. No. 60/147,370, filed Aug. 5, 1999, entitled "LAWN MOWER DESIGNS".

FIELD OF THE INVENTION

The invention relates generally to lawn mowers, and particularly relates to riding and walk-behind mowers. One aspect of the invention particularly relates to the use of a device which causes the lawn mower to stop cutting and/or moving, when the lawn mower contacts a foreign object when in reverse.

BACKGROUND OF THE INVENTION

Lawn mowers are well known. Reference is made to the many Snapper and other lawn mowers on the market.

Although such configurations include advantages, there is always room for improvement.

Therefore it may be seen that there is a need in the art for an improved lawn or other vegetation cutting device.

SUMMARY OF THE INVENTION

The present invention provides lawn mower features as set forth below.

Generally described, the present invention overcomes deficiencies in the art by providing an apparatus which disables the cutting blade and/or drivetrain of a lawn mower when a foreign object is contacted.

It is further object of the present invention to provide an improved lawn mower which has improved operating features.

It is further object of the present invention to provide an improved lawn mower which has improved operating features when in reverse.

It is further object of the present invention to provide an improved lawn mower which has improved operating features when cutting in reverse.

It is further object of the present invention to provide an improved lawn mower which has improved operating features when cutting in reverse near obstacles.

It is further object of the present invention to provide an improved lawn mower which has improved operating features when cutting in reverse in high grass or other vegetation.

It is a further object of the present invention to provide an improved lawn mower having features which make it easy to operate.

Other objects, features, and advantages of the present invention will become apparent upon reading the following detailed description of the preferred embodiment of the invention when taken in conjunction with the drawing and the appended claims.

DETAILED DESCRIPTION OF THE INVENTION

Reference is now made to the drawings, in which like numeral indicate like numeral throughout the several views.

General Construction and Operation

The configuration of FIGS. 1–10 include what would be referenced as a "no drive on contact" bar assembly such as 20. Contact with the bar assembly disengages the drive and applies the brake. A reset lever is also provided for reset purposes.

A pivoting bar is used to push a trip lever. This disengages the drive and can also apply the brake.

Engine kill or blade stoppage alone could also be provided.

More Detailed Discussion

Reference is now made to FIGS. 1–9, which describe a configuration which may be referenced as a "no drive in contact" feature. Generally described, this feature disengages the drive of a self-propelled lawn mower should the lawn mower come in contact with a foreign object in a particular manner.

Figure 1:
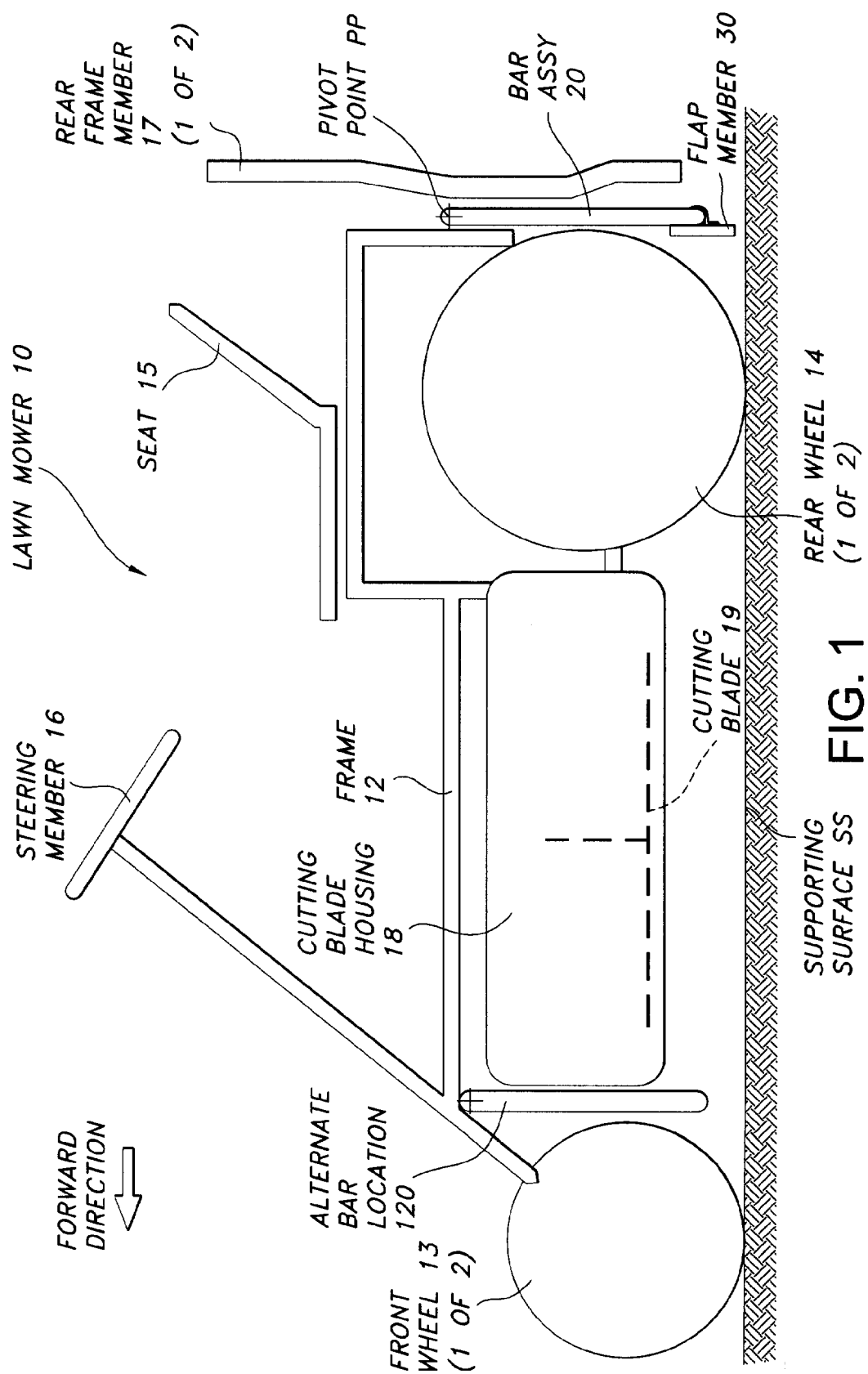
FIG. 1 is a left side elevational view of a lawn mower 10 according to one embodiment of the present invention, which includes the use of a contact bar assembly 20 according to the present invention.

Lawn Mower Assembly 10 (See FIG. 1)

A lawn mower assembly 10 is provided for use with the present invention. This lawn mower 10 shown in FIG. 1 is of a "rear engine rider" configuration, although other configurations are contemplated without departing from the spirit and scope of the present invention. The lawn mower 10 illustrated in FIG. 1 is shown in a side elevational view with its forward moving direction being toward the viewer's left.

The lawn mower 10 includes a frame 12, two front wheels 13, two rear wheels 14, a seat 15, a steering member 16, and a pair of rear frame members 17 and attached to the rear of the vehicle.

Underneath the frame is positioned a cutting blade housing 18 which covers a cutting blade 19.

Positioned towards the rear of the apparatus is a pivoting reverse contact bar assembly 20.

Figure 2:
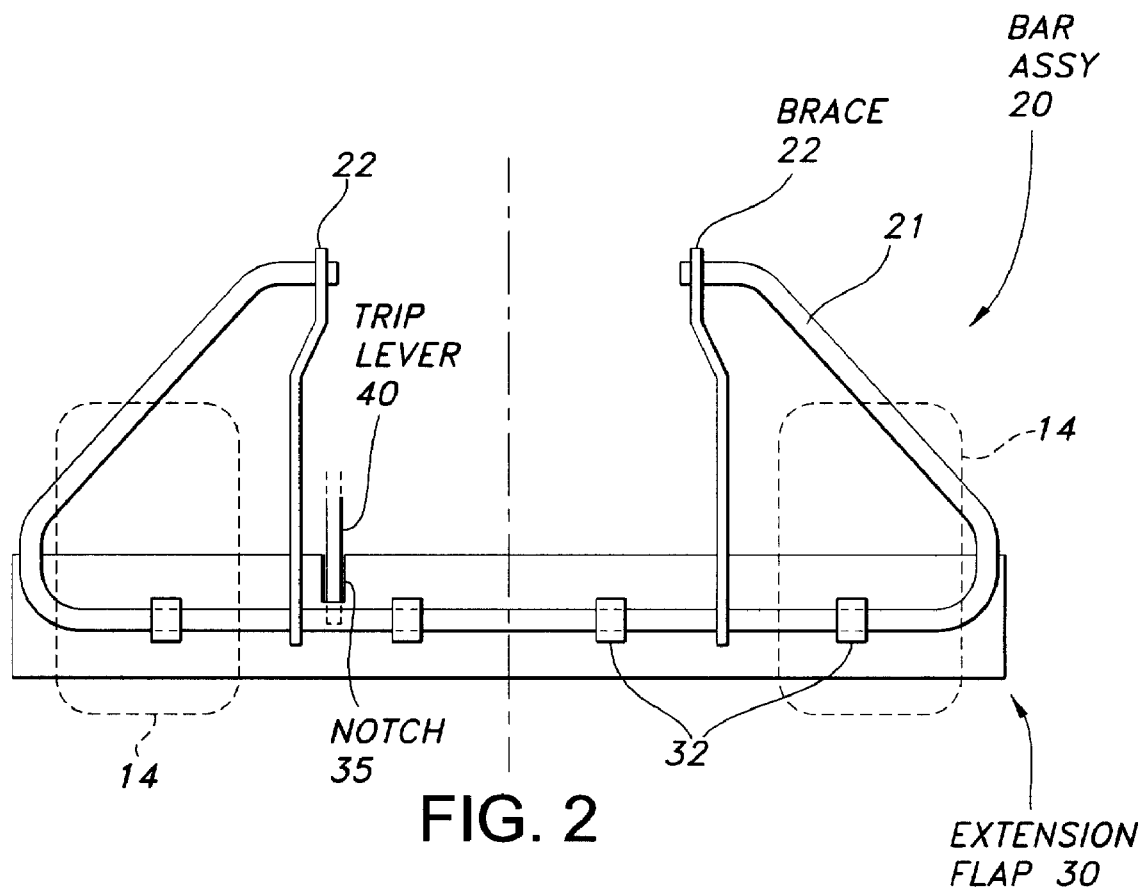
FIG. 2 is a rear elevational view of an isolated contact bar assembly 20 (including an extension flap assembly 30), illustrated relative to rear wheels 14 (shown in phantom). A portion of a trip lever 40 is also shown contacting the extension flap 30.

Reverse Contact Bar Assembly 20 (See also FIG. 2)

Figure 3A:
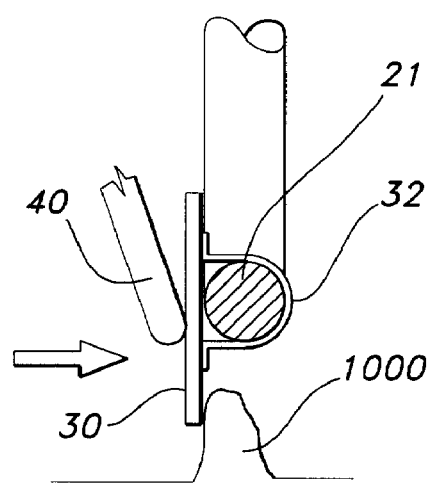
FIGS. 3A and 3B are illustrated views of an extension flap 30 as used in connection with a contact bar assembly 20. This is a partial view of the contact bar assembly 20, with the extension flap 30 shown in cross-section and in contact with a portion of the trip lever 40.

The reverse contact, bar assembly 20 is pivotably mounted relative to the overall frame of the lawn mower apparatus 10, and is spring-loaded into a particular position along its pivoting range. Upon contact with an obstacle such as shown in FIG. 3A, the reverse contact bar assembly 20 is "tripped", which through a series of links causes both the cutting blade 19 and the drive clutch to be disengaged, thus stopping the cutting blade and preventing the engine from driving the rear drive wheels.

FIG. 2 shows an overall isolated view of the reverse contact bar assembly 20 according to the present invention. This assembly 20 includes the following:

- a bent bar portion 21;
- two braces 22; and
- a pivoting extension flap member 30.

The bent bar portion 21 may be seen as being bent around several bends, and is attached to the two brace members 22. The brace members 22 include at least two holes at their marginal ends, each hole being configured to accept the cross-section of the bent bar portion in a pass-through manner. The brace members 22 are in the embodiment shown welded relative to the bent bar portion 21. Thus the bent bar portion 21 and the two brace members 22 combine to form a unitary subassembly.

Figure 8:
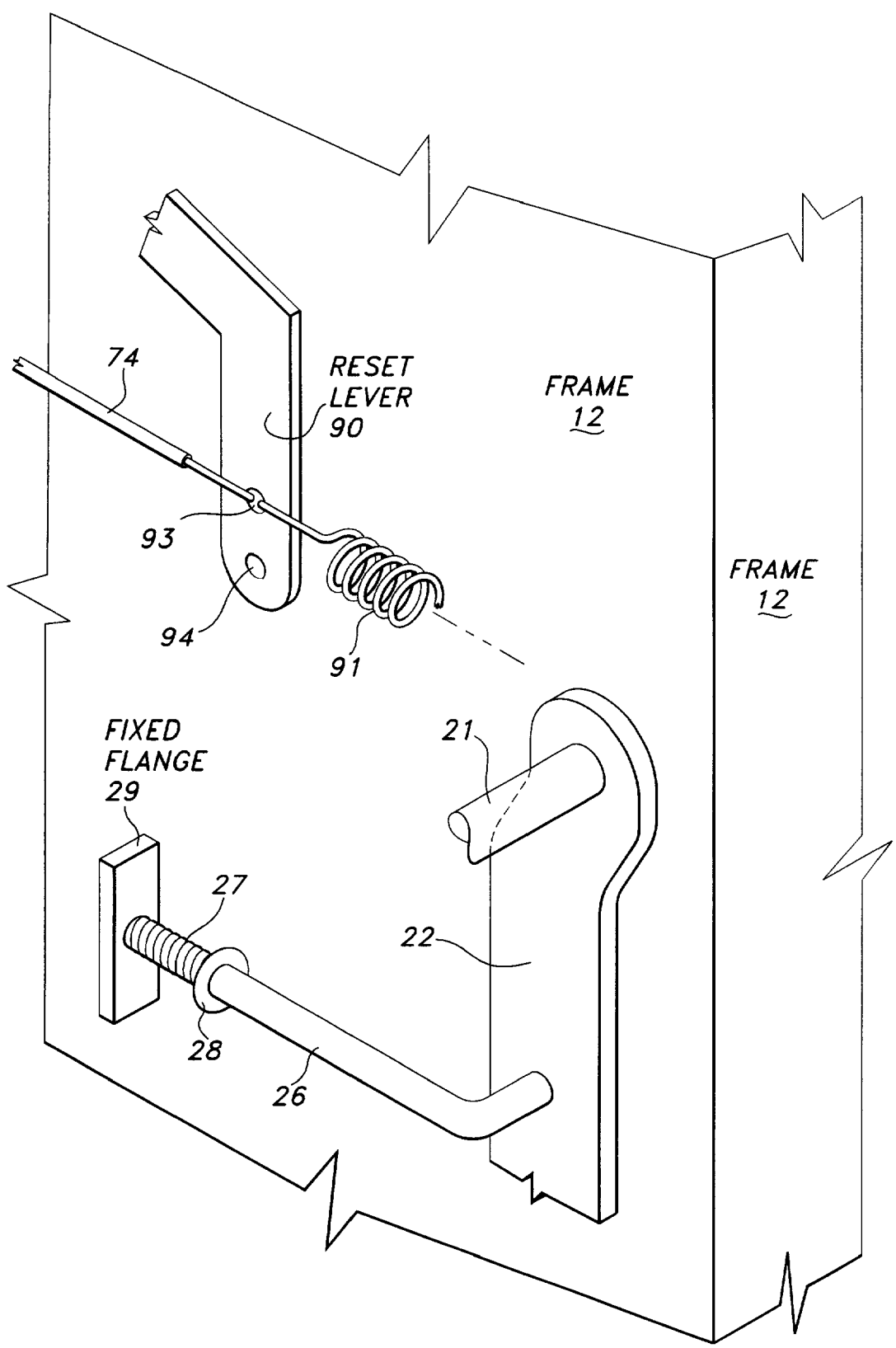
FIG. 8 is a partial pictorial view of a left rear portion of a lawn mower apparatus according to the present invention, illustrating a reset lever 90 pivotably attached relative to the frame 12, as well as a reverse bar spring rod 26 and a reverse bar spring 27.

The reverse contact bar assembly 20 pivots relative to the frame of the lawn mower assembly 20 about Pivot Point PP shown in FIG. 1. As described in later detail this pivoting could be referenced as being between a first, "set", position, and a second, "tripped" position. Also as described in later detail, the reverse contact bar assembly 20 is spring-loaded towards its set position by a spring 27 such as shown in FIG. 8 or some other suitable bias device.

In one preferred embodiment, a pivoting extension flap member 30 is pivotably attached to the lower portion of the bent bar portion 21, such that the pivoting extension flap member 30 is allowed to pivot about a substantially horizontal axis when the lawn mower is positioned on level ground.

Figure 3B:
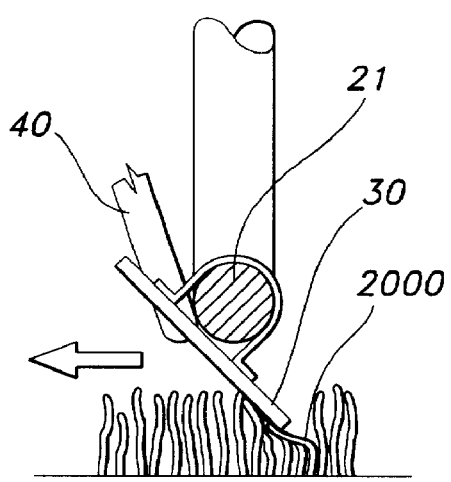

Reference is now made to FIGS. 3A and 3B to illustrate the pivoting feature provided by the pivoting extension flap member 30 according to the present invention. The arrows show the general movement of the lawn mower.

In FIG. 3A, the flap member 30 is shown in its "normal" position, with its primary planar surfaces being substantially vertical. In this configuration, the lower edge of the pivoting extension flap member 30 can be seen to be somewhat below the lowermost portion of the bent bar portion 21.

In the situation shown in FIG. 3A where the operator is moving the apparatus in reverse, it may be understood that an obstacle such as 1000 may be encountered. As discussed in detail elsewhere in this application, this causes pivoting of the reverse contact bar assembly 20, which causes further mechanical actions described later below.

FIG. 3A is now compared with FIG. 3B. In the FIG. 3B situation, the pivoting extension flap member 30 is encountering some "high grass" 2000 and, which causes it to pivot to allow for the high grass to pass thereby with less drag. However, it may be understood that such a pivoting feature is only intended to occur when the apparatus 10 is being moved in its forward direction as shown by the arrow in FIG. 3B. Preferably, in this situation, the trip lever 40 is not tripped as described later.

In one embodiment, the pivoting extension flap member 30 is spring-loaded into a down position, such that a lower edge of the gate is positioned approximately 2" below the lower most surface of the ½" rod used for the bent bar portion.

The pivoting extension flap member 30 is pivotably attached to relative to the lower portion of the bent bar portion 21 by use of various fastening brackets 32, positioned at various locations along the length of the relatively elongate pivoting extension flap member 30. These brackets are configured to capture the cross-section of the bent bar portion 21, while allowing pivoting of the pivoting extension flap member 30 relative to the bent bar portion 21. Spring loading may be provided by use of a torsion spring which winds about the lower portion of the bent bar portion 21 and has its radial engagement portions in contact with the brace and the flap.

It should be understood that the movable pivoting nature of the flap allows for the flap to be "directional", in that it may be able to pass over certain obstacles in one (e.g. the forward) direction, but not in another (e.g., the reverse) direction. It should also be understood that other non-pivoting configurations are contemplated, such as sliding configurations.

Reference is now made to FIG. 2, which shows a notch 35 in the pivoting extension flap member 30, which allows a trip lever 40, described below in further detail, to pass therethrough when the pivoting extension flap member 30 pivots from its position shown in FIG. 3A–FIG. 3B.

In the configuration shown in FIG. 3B, the function of the notch 35 is evident, as in the 3B configuration, the trip member 40 is positioned within the slot. This discourages tripping of the trip lever 40 when the extension flap member 30 is pivoted such as shown in FIG. 3B.

As noted above, the reverse contact bar assembly 20 is pivotably mounted relative to the overall frame of the lawn mower apparatus 10, and is spring-loaded into a particular position along its pivoting range. This springing is provided by a compression spring such as 27 shown in FIG. 8. This compression spring is positioned between fixed flange 29 and a stop 28 of a reverse bar spring 27. Other bias devices could also be used in place of the particular spring 27.

The fixed flange 29, shown in FIG. 8, is rigidly attached to the side of the frame 12 of the lawn mower 10 according to the present invention. The fixed flange 29 defines a hole therethrough.

The reverse bar spring rod 26, shown in FIG. 8 includes a short end and a long end. The short end is configured to go into a hole in the medial portion of one of the brace members 22 and be retained therein by a cotter pin. The longer end of the rod 26 includes a stop member 28, which is spaced apart from the free end of the long end. The free end of the long end of the rod 26 is smooth and blunt.

During assembly, the reverse bar spring 27 is passed over the free end of the long portion of the reverse bar, spring rod 26, and is kept there. The free end of the long portion of the reverse bar spring rod is passed through a hole in the fixed flange 29, such that the spring 27 is captured between the fixed flange 29 and the stop portion 28 of the long end of the reverse spring rod.

When the short portion of the reverse bar spring rod is passed through the hole in the brace member 22 and retained therein, it may be understood that the spring 27 is in a position which facilitates its use as a compression spring. It may be understood that the selection of the strength and the properties of this compression spring 27 allow one (including the manufacturer) to select the amount of spring pressure required to cause the reverse contact bar assembly 20 to be pivoted as discussed below by contact with an object while the apparatus 10 is in reverse.

The spring 27 is preferably calibrated to prevent pivoting of the reverse contact bar assembly 20 if the user is backing up in heavy grass, but a single, more stable object such as a tree trunk or rock could cause pivoting.

Figure 4:
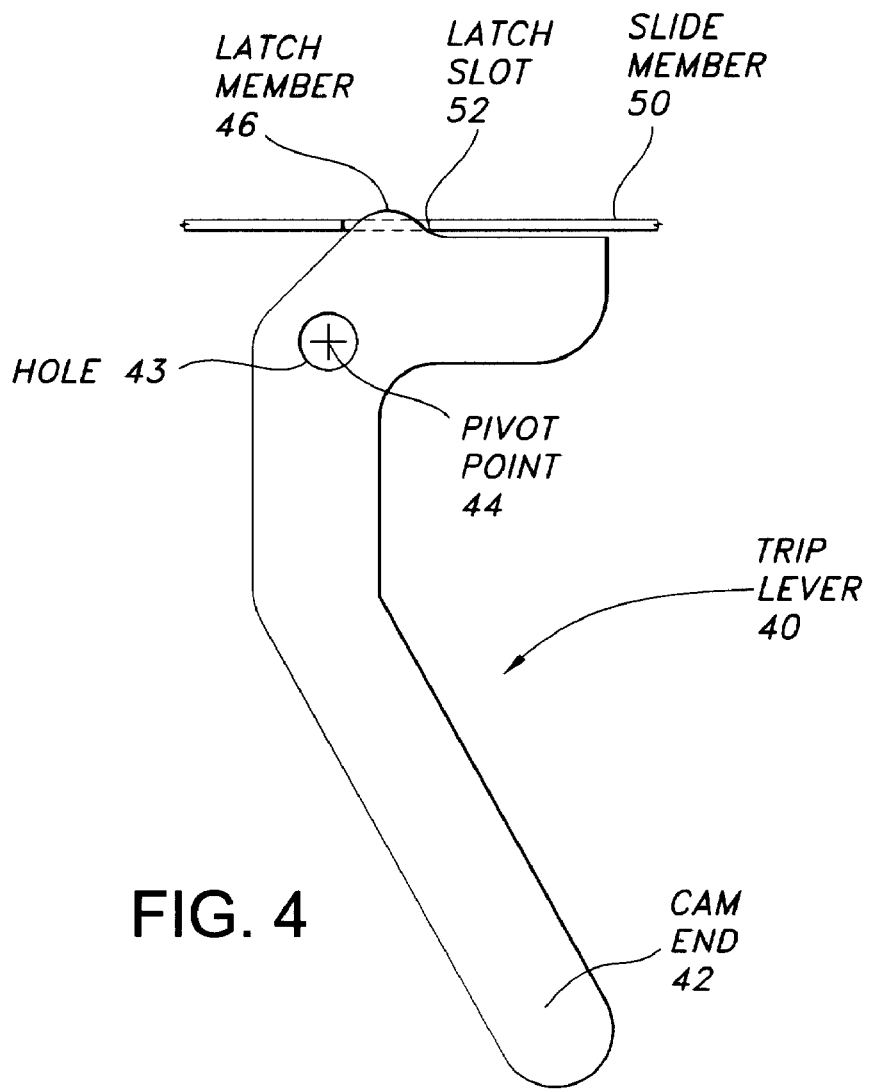
FIG. 4 is an isolated view of the trip lever 40, shown in engagement with a slide member 50. The latch member 46 of the trip lever 40 is shown in engagement with the latch slot 52 of the slide member 50, which is shown partially and in cross-section.

Trip Member 40 (FIG. 4)

A trip member 40 is used to retain a slide member 50 in its retracted position until the trip member is "tripped" by the reverse contact bar assembly 20. When the trip member 40 is tripped, it releases the slide member 50 such that the slide member 50 slides due to spring force by a tension spring as described in later detail.

Reference is now made to FIG. 4, which illustrates the trip member 40. In this figure, the trip member 40 is shown in a relatively isolated position, in that the hardware which supports it in a pivoting relationship is not shown. However, it should be understood that hardware described later pivotably mounts the trip member 40 relative to the frame of the apparatus 10 by use of hole 43.

The trip member 40 includes a lower cam end 42, a hole 43, and a latch member 46. A torsion spring (shown in FIG. 7) is configured to maintain a torsional force on the trip member to provide a counterclockwise bias on the trip member about pivot point 44 as described later in this application.

The latch member 46 is configured to fit within a latch slot 52 of slide member 50. When the trip member 40:, is pivoted from its initial position as shown in FIG. 4 to its "tripped" position shown in FIG. 5, the trip member 40 has pivoted an angular amount in the direction of arrow "1" sufficient to withdraw the latch member 46 from the latch slot.

Figure 5:
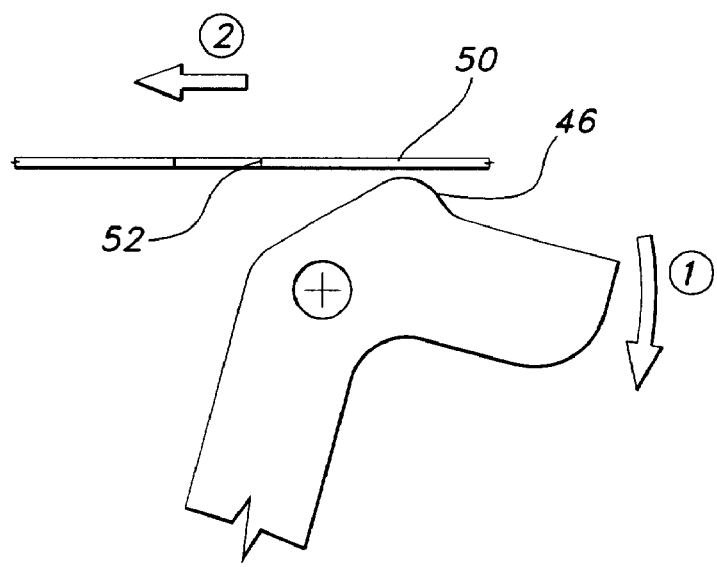
FIG. 5 is a view of a portion of that shown in FIG. 4, except that the trip lever 40 is shown slightly rotated, and the slide member 50 has moved to the left due to disengagement with the trip lever 40.

As the slide member 50 is spring-loaded in the position of arrow "2" in FIG. 5, this causes the slide member 50 to move in the direction of arrow "2".

As described later in this application, the above-referenced sliding movement of the slide member 50 is used to provide several functions for separate mechanical features. These features include braking and declutching.

Slide Member 50

As noted above, the slide member 50 is retained in a "set" position such as shown in FIG. 4, until released to slide under spring force to the "tripped" position shown in FIG. 5.

Figure 6:
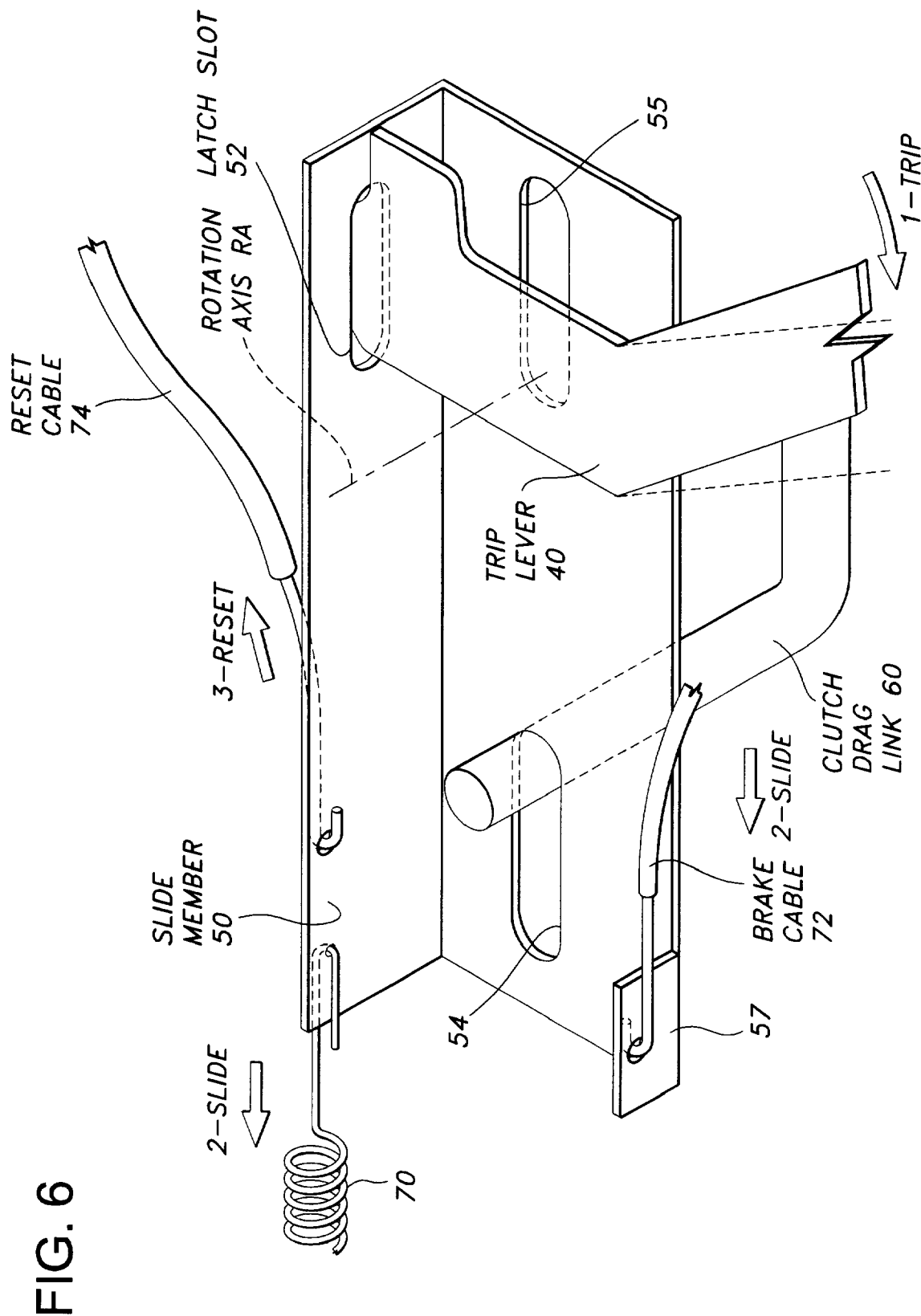
FIG. 6 is a pictorial illustrated view of the slide member 50, shown in connection with various associated elements.

Reference is now also made to FIG. 6 which illustrates the slide member 50 according to the present invention, in conjunction with a trip lever 40, a clutch drag link 60, a slide biasing spring 70 (shown in illustrative form), a brake cable 72, and a reset cable 74.

The slide member 50 includes a main body portion, a long upper flange 56, and a short lower flange 57. The slide member 50 could thus be thought of as having through much of its length a L-shaped transverse cross-section (defined by the main body portion and the long upper flange 56), while at one end having a additional short lower flange 57 which provides it with what could be referenced as a "J-shaped" transverse cross-section.

The long upper flange 56 defines an elongate latch slot 52, and defines various holes which are configured to accept the return spring 70 and reset cable 74. The short lower flange 57 is configured to accept the brake cable 72.

It may be generally understood that the slide member 50 shown in FIG. 6 is slidably mounted relative to the frame of the cutting apparatus 10. The direction of this sliding is generally along an axis parallel to the front-to-back orientation of the cutting apparatus 10. The sliding direction is guided by use of the elongate guide slots in the main body portion 51 of the slide member 50. These elongate slots are separately described as a leading guide slot 54, and trailing guide slot 55. As may be seen, these leading and trailing guide slots 54, 55 respectively, are positioned substantially along a common longitudinal axis which is substantially parallel to the longitudinal axis of the relative elongate slide member 50.

The slide member 50 is acted upon by a significant spring force due to spring 70. In one embodiment this spring force can approach 100 pounds, although obviously other forces may be provided as needed. Such a force is utilized under the present invention due to provide significant mechanical actions, such as braking and declutching.

It should also be understood that the slide member 50 can be retracted from its "tripped" position of FIG. 5 back to its "set" position of FIGS. 6 and 4 by use of reset lever 90 such as shown in FIG. 8. This reset lever 90 will be discussed later in further detail, but in summary the reset lever 90 is configured to be manually pivoted by the user such that an intermediate cable 74 pulls the slide member 50 back to its position as shown in FIG. 4. This allows the latch member 46 to re-engage the slot 52 of the slide member 50, thus retaining the slide member 50 in its "set" position until the trip lever 40 is tripped again. It may be understood that such a retraction is done against the spring force associated with spring 70 discussed above.

As shown in FIG. 6, a brake cable 72 leads from the slide member 50 to a conventional brake apparatus. Thus as the brake cable is placed into tension as the slide moves right-to-left as FIG. 6 is viewed, the brake is applied. Upon reset of the slide member, the brake is released (unless otherwise depressed).

Figure 9:
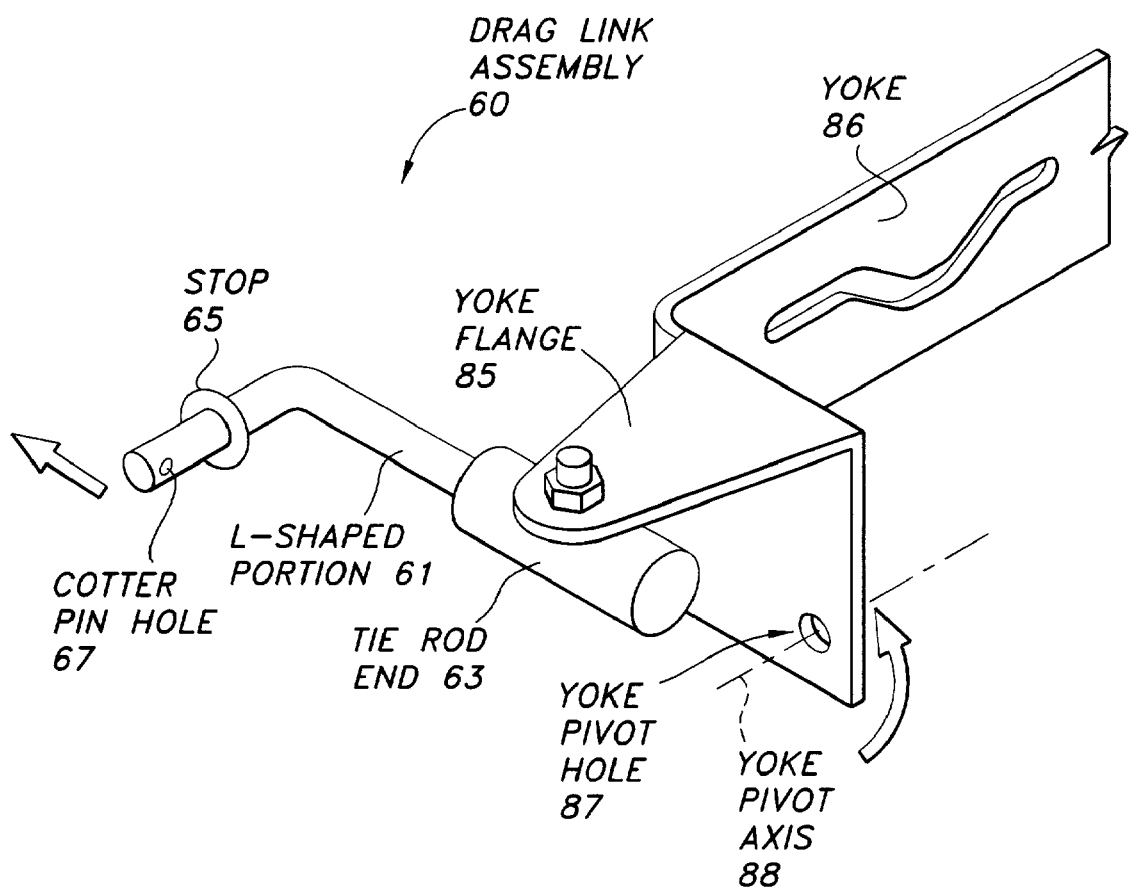
FIG. 9 is a pictorial partial view of a clutch drag link assembly 60, attached to a yoke flange 85, which is itself attached relative to a conventional yoke 86, which is configured to rotate about a yoke pivot axis 88.
Figure 10:
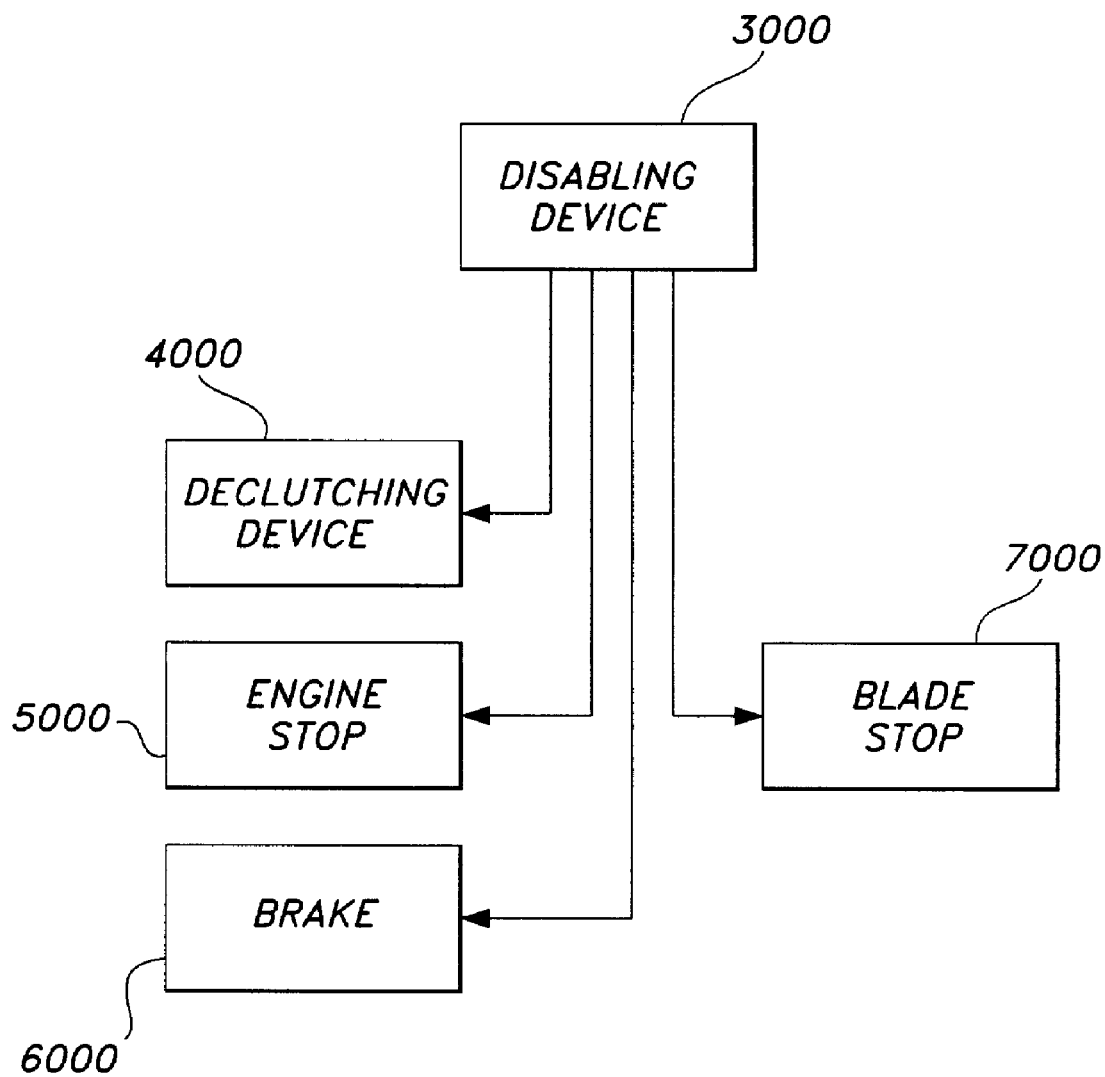
FIG. 10 is an illustrative view showing various things the "disabling device" 3000 can control, including a declutching device 4000, engine stop 5000, brake 6000, and blade stop 7000. Engine stop can be done by use of engine kill switches and associated circuitry such as known in the art. Blade stop can also be effected as known in the art, such as by moving a pulley or by deactivating a BBC (Blade Brake Clutch).

Clutch Drag Link Assembly 70 (FIGS. 6 and 9)

A drag link member 70 is used to provide a mechanical link between the slide member 50 and a clutch yoke member 86, such that movement of the slide member 50 from its set to its tripped position causes the drive line to the drive wheels to be declutched at about the same time the apparatus is braked.

The clutch drag link assembly 60 includes an L-shaped rod portion and a tie rod end portion. The L-shaped rod portion is composed of a short leg and a long leg. The short leg has a cotter pin hole towards its free end and a stop spaced further away from the free end. The long leg has a threaded free end which threadably engages a tie rod end, which includes an internal ball joint and a threaded tie rod shaft portion 68 threadably configured to threadably engage a nut 69.

A friction disk guide yoke 86 is configured to pivot about an axis 88 by use of a fastener (not shown) which passes through the yoke pivot hole 87. The yoke 86 includes a yoke flange 85 rigidly extending therefrom.

The threaded tie rod shaft portion 68 passes through a hole in the yoke flange 85, and is attached thereto by nut 69. Thus the L-shaped portion of the drag link assembly 60 could be thought of as being attached to the yoke flange 85 by a ball joint. It may thus also be understood that movement of the short leg of the L-shaped portion of the drag link assembly 60 in the direction of the straight arrow in FIG. 9 causes rotation of the yoke around axis 88 in the direction of the curved arrow. Such rotation is similar to rotation of the yoke in its normal declutching movement as known in the art, and is not further described herein for purposes of brevity. However, any suitable declutching movement may be used under the present invention.

Additional information is now provided with reference to the interaction of the slide member 50 with the remainder of the apparatus 10. As noted before, the slide member is configured to slide relative to the remainder of the apparatus along a linear guide path, and is guided along said path by use of a leading and trailing guide slots 54, 55, respectively. The leading guide slot has only the short leg of the L-shaped portion 61 of the drag link assembly 60 passing through it, and is thus guided thereby. The short leg of the L-shaped portion 61 of the drag link assembly 60 also passes through another elongate slot in the frame of the apparatus (not shown), which is substantially co-extensive with the leading guide slot 54 when the slide member 50 is in its set position. This allows the clutch drag link to travel along both slots during operator clutching without affecting the slide member.

As noted before, the short leg of the L-shaped portion 61 of the drag link assembly 60 passes through slots in the slide member 50 and the frame of the apparatus. The slide member is slidably retained relative to the frame of the apparatus by the combination of the stop 65 and a cotter pin (not shown) which extends through the cotter pin hole 67.

Bushing 80 and Attached Elements

Figure 7:
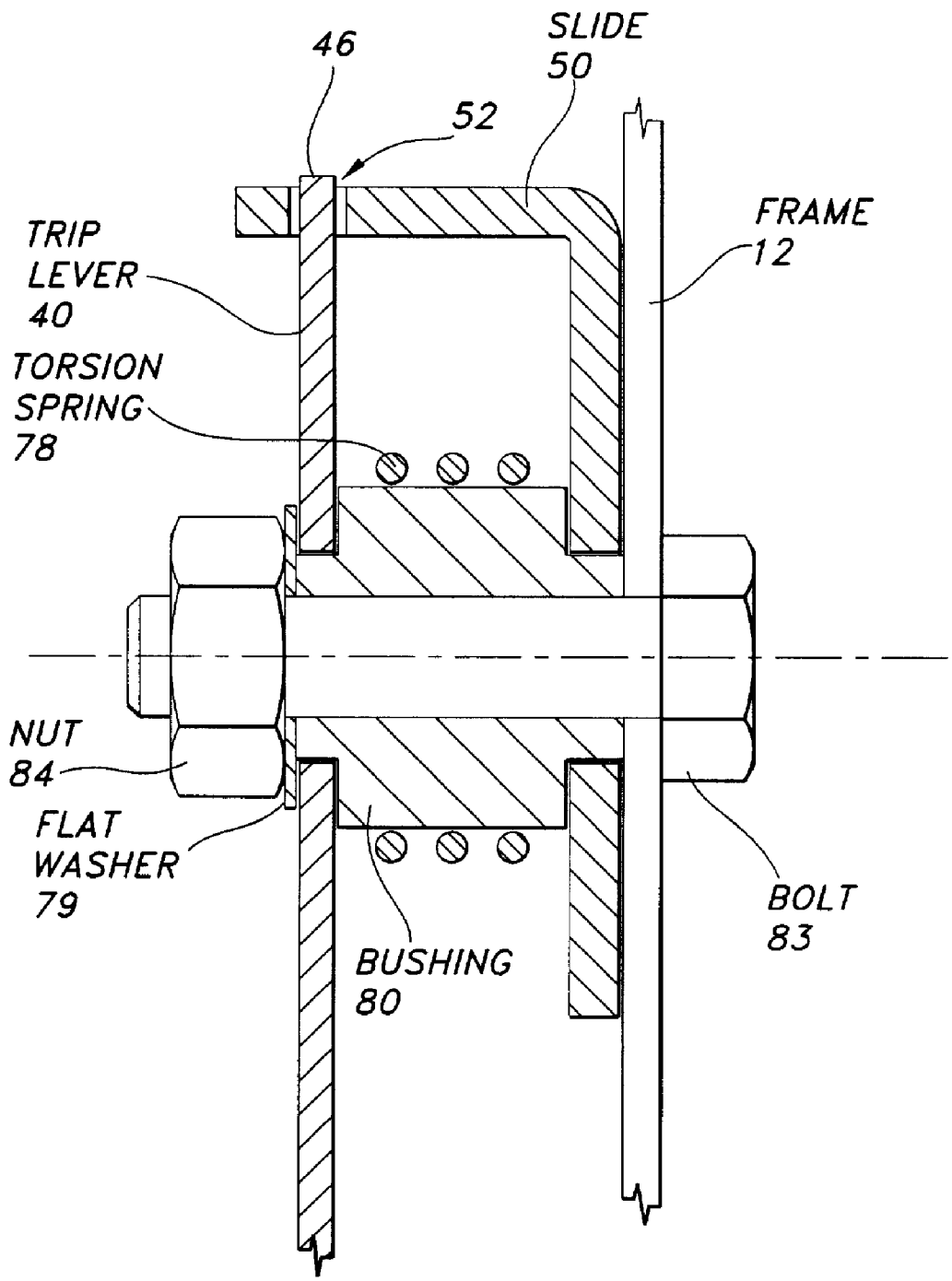
FIG. 7 is a cross-sectional view of a bushing 80, shown in conjunction with other elements shown in cross-section, namely a trip lever 40, slide 50, and a fastening nut and bolt.

Reference is now made to FIG. 7, which illustrates a guide bushing 80, which is configured to be rigidly attached relative to the frame 12 of the apparatus by use of a threaded nut 84 and bolt 83. The bolt passes through a hole in the frame 12, the trailing guide slot of the slide member 50, the bore of the bushing 80, the hole 43 of the trip lever 40, a flat washer 79, and is captured by the nut 84. A torsion spring 78 fits around the bushing 80 and is configured to maintain a torsional bias on the trip lever towards its "set" portion.

Thus the bushing 80 and the frame 12 combine to provide a sliding guide for the sliding action of the slide 50, the bushing 80 and the flat washer combine to provide a rotating guide for the trip lever.

Reset Lever 90 (FIG. 8)

In order to reset the slide 50, a reset lever 90 with a suitable reset cable 74 therebetween is configured to reset the device. FIG. 8 is an isolated view of a reset lever 90 according to the present invention. Reset cable 74 has one end attached relative to the reset lever 90 and the other end attached relative to the slide 50.

The elongate handle member 90 is configured to be manually pivoted by a user and pivoted around the hole 94. A second hole 93 is used to attach relative to one end of cable 74. A return spring 91 can also have one end attached in hole 93 and the other end attached relative to the vehicle frame.

Other Options

It should be understood that, although the invention as shown in FIG. 1 includes the use of a contact bar assembly which is positioned in the rear of the apparatus, a similar assembly can be used towards the front of the apparatus as shown as 120 in FIG. 1. Such an assembly could be positioned in front of the front wheels, such as might be understood as a "front bumper"-type configuration, or alternately such could be positioned as shown behind the front wheels.

This could be used on a riding lawn mower or alternate use as a garden tractor, or could also be used within various apparatuses such as known in the art. The "disabling device" which previously described declutching and/or braking could also be used to provide engine kill and/or blade stop as desired, upon the "tripping" of the reverse contact bar assembly.

If a vacuum system is used to control the blade, the vacuum could be disengaged to disengage the blade, is so desired.

Other Concepts

Other concepts may be mentioned at this time. A commercial walk-behind law mower according to another present invention which uses Eaton transaxles, the same as is used on the HomeOwner Zero Turn units, and dual oil reservoirs are used to prevent any cross contamination. These transaxles are mounted for horizontal input, the inventors are able to use a horizontal shaft engine that mounts directly over the axles. This provides excellent balance superior to other models in this category.

A horizontal shaft engine allows the inventors to use a quick connect automatic style universal joint drive shaft to propel the deck and the belt drive becomes the same as the trouble free drive of the Out Front and Mid Mount units. With the horizontal input, both the electric clutch belt and the transmission drive belt are easily replaceable.

The excellent balance afforded by this design allows the inventors to fold the handles forward and stand the entire mower up on its rear frame for service. This is also a first known for this category.

The invention can have larger front caster (11×4.00–5) and larger drive wheels (18×8.00–8) than other walk mowers in our line, and front caster brackets are replaceable.

The rear height of cut is an Acme thread screw jack arrangement that incorporates a rear guide rod that absorbs both impact and bending loads thus protecting the threaded adjusters. This provides easy deck adjustment and longer thread life. The bracket is notched to indicate height of cut settings to make it easy to set the same on both sides. The front height of cut is accomplished with the use of split spacers. The deck has a height of cut range from 1½" to 4 ½" and it is not necessary to move blade spacers. The deck attached to the rear frame with a heavy shoulder bolt connection. This pivot connection is secured with ,the use of two ⅜" bolts and weld nuts. By removing these two ⅜" bolts and disconnecting the quick connect end of the drive shaft from the power unit the deck will flip up for service and or storage. With the deck flipped up and the handles folded forward the unit takes up only 31 inches of trailer space.

The handle is attached with a quick connect lever that allows for easy release and dependable locking when the handle is folded or positioned for operation.

The power unit is 40 inches wide and the wheelbase is 42 inches. This essentially square design provides excellent stability and maneuverability.

The loop handle controls are easy to use and require less steering effort than conventional hydro units. They can operate the same as other prior art hydros and make use of a thumb latch neutral lock for starting and stopping.

A spring-loaded park brake/neutral control is located on the left side of the control panel. This automatic mechanism puts the transmissions in neutral and locks the internal transmission brakes any time the operating presence bale is released. If the blade is running when the bale is released the transmissions will go to neutral, the brakes will lock and the engine will kill stopping motion of machine and blades.

While this invention has been described in specific detail with reference to the disclosed embodiments, it will be understood that many variations and modifications may be effected within the spirit and scope of the invention as described in the appended claims.

That which is claimed:

1. An apparatus for use with a lawn mower having a frame, a grass cutting blade, and a self-propelling motor driving a powered drive wheel, said apparatus for use within an environment including an obstacle extending upwardly from said generally planar surface, said apparatus comprising:

a contact member extending generally rearwardly of said lawn mower, said contact member being movably attached relative to said frame of said lawn mower from a first, set, position to a second, tripped, position;

a disabling device for disabling said powered drive wheel from a driving mode to a non-driving, disabled, mode, said disabling device configured to be moved between a set position to a tripped position, and also configured to store more energy when in said set position than when in said tripped position, the difference in energy between that stored by said disabling device when in said set position compared to when in said tripped position being an energy difference, said disabling device being spring loaded by a spring which is configured to store energy; and a link between said contact member and said disabling device, said link configured to cause said disabling device to release at least a portion of said energy difference so as to disable said powered drive wheel upon movement of said contact member from said set position to said tripped position, such that if said lawn mower is moved into reverse and said obstacle is contacted by said contact member causing said contact member to move from said set to said tripped position, said powered drive wheel is disabled by the release of said portion of said energy difference.

2. An apparatus for use with a lawn mower having a frame, a grass cutting blade, and a self-propelling motor driving a powered drive wheel, said apparatus for use within an environment including an obstacle extending upwardly from said generally planar surface, said apparatus comprising:

a contact member extending generally rearwardly of said lawn mower, said contact member being movably attached relative to said frame of said lawn mower from a first, set, position to a second, tripped, position;

a disabling device for disabling said powered drive wheel from a driving mode to a non-driving, disabled, mode, said disabling device configured to be moved between a set position to a tripped position, and also configured to store more energy when in said set position than when in said tripped position, the difference in energy between that stored by said disabling device when in said set position compared to when in said tripped position being an energy difference, said disabling device comprising a slide member slidably mounted to said frame of said lawn mower; and a link between said contact member and said disabling device, said link configured to cause said disabling device to release at least a portion of said energy difference so as to disable said powered drive wheel upon movement of said contact member from said set position to said tripped position, such that if said lawn mower is moved into reverse and said obstacle is contacted by said contact member causing said contact member to move from said set to said tripped position, said powered drive wheel is disabled by the release of said portion of said energy difference.

3. An apparatus for use with a lawn mower having a frame, a grass cutting blade, and a self-propelling motor driving a powered drive wheel, said apparatus for use within an environment including an obstacle extending upwardly from said generally planar surface, said apparatus comprising:

a contact member extending generally rearwardly of said lawn mower, said contact member being movably attached relative to said frame of said lawn mower from a first, set, position to a second, tripped, position;

a disabling device for disabling said powered drive wheel from a driving mode to a non-driving, disabled, mode, said disabling device configured to be moved between a set position to a tripped position, and also configured to store more energy when in said set position than when in said tripped position, the difference in energy between that stored by said disabling device when in said set position compared to when in said tripped position being an energy difference, said disabling device being spring loaded by a spring which is configured to store at least part of said energy difference; and a link between said contact member and said disabling device, said link configured to cause said spring of said disabling device to release at least a portion of said energy difference so as to disable said powered drive wheel upon movement of said contact member from said set position to said tripped position, such that if said lawn mower is moved into reverse and said obstacle is contacted by said contact member causing said contact member to move from said set to said tripped position, said powered drive wheel is disabled by the release of said portion of said energy difference by said spring.

* * * * *